United States Patent [19]
Zecher

[11] 3,793,194
[45] Feb. 19, 1974

[54] SCALE AND CORROSION CONTROL IN FLOWING WATERS
[75] Inventor: David C. Zecher, Newark, Del.
[73] Assignee: Hercules Incorporated, Wilmington, Del.
[22] Filed: Feb. 28, 1972
[21] Appl. No.: 230,060

Related U.S. Application Data
[63] Continuation-in-part of Ser. No. 127,756, March 24, 1971, abandoned.

[52] U.S. Cl................................... 210/58, 252/180
[51] Int. Cl................................................ C02b 5/04
[58] Field of Search............ 210/58; 21/2.7; 252/180

[56] References Cited
UNITED STATES PATENTS
3,639,292    2/1972    Gilby ..................................... 210/58
3,462,365    8/1969    Vogelsang............................. 210/58

Primary Examiner—Samih N. Zaharna
Assistant Examiner—Benoit Castel
Attorney, Agent, or Firm—Michael B. Keehan

[57] ABSTRACT

Disclosed is a method of conditioning water, particularly flowing or circulating water streams (e.g., as used in cooling water systems), to reduce the corrosive attack and/or scale accumulation on metal surfaces which the water contacts. The method includes introducing into the water a water soluble cationic polymer and a polyphosphate. The cationic polymer is a polyamide containing quaternary ammonium groups or a polyureylene containing quaternary ammonium groups. The polyphosphate is an inorganic polyphosphate or a polyfunctional acid phosphate ester of a polyhydric alcohol (i.e., a phosphorylated polyol). The cationic polymers synergistically increase the effectiveness of the polyphosphate as corrosion and scale inhibitors in certain waters. A typical inorganic polyphosphate is sodium tripolyphosphate. A typical phosphorylated polyol is phosphorylated pentaerythritol.

3 Claims, No Drawings

SCALE AND CORROSION CONTROL IN FLOWING WATERS

This application is a continuation-in-part of my copending application, Ser. No. 127,756, filed Mar. 24, 1971, now abandoned.

The present invention relates to a method of conditioning water, and more particularly for conditioning flowing or circulating water streams (e.g., as used in cooling water systems) to reduce the corrosive attack and/or scale accumulation on metal surfaces which the water contacts.

Cooling waters are used in many industrial processes to remove heat. Most waters used for this purpose contain dissolved solids which tend to form insoluble deposits (i.e., scale) on metal surfaces which they contact, particularly the metal components of heat exchangers.

Among the most effective and widely used corrosion and scale inhibitors at present are formulations based on chromium compounds in the hexavalent oxidation state, e.g., the chromates and dichromates of sodium, potassium and zinc. However, chromium-based inhibitors have several disadvantages, among the most serious of which are toxicity, staining, and incompatibility with reducing agents (e.g., $H_2S$ and $SO_2$) often present in the air drawn through cooling towers. Recently there has been a substantial increase in demand for nonchromate nontoxic corrosion and scale inhibitors. Among the nonchromate nontoxic corrosion and scale inhibitors, polyphosphates including more specifically inorganic polyphosphates have been used and more recently polyfunctional acid phosphate esters of polyols (i.e., phosphorylated polyols); however, both of these nonchromate classes of polyphosphates are generally less efficient corrosion and scale inhibitors than those containing chromate, hence there is a substantial need for increasing their efficiency.

According to the present invention it has been found that certain water soluble cationic polymers increase the efficiency of certain polyphosphates, as hereinafter defined, as corrosion and scale inhibitors in certain waters. The increase in efficiency has been found to be synergistic in many waters depending primarily upon the constituents present in the water.

The term "synergistic" is used herein in its usual sense to mean that the reduction in corrosion and/or scale deposition under a given set of circumstances using the combination of the present invention (i.e., cationic polymer plus polyphosphate) is substantially greater than the sum of the corrosion and/or scale deposition results obtained using the cationic polymer alone plus that obtained using the polyphosphate alone.

Unless otherwise stated, as used herein, the term polyphosphates means (1) inorganic polyphosphates (2) phosphorylated polyols, and (3) the corresponding acids of (1), and the term inorganic polyphosphates includes the corresponding acids thereof.

Polyphosphates applicable herein are:
1. an inorganic polyphosphate having a molar ratio of alkali metal oxide, alkaline earth metal oxide, zinc oxide and combination thereof to $P_2O_5$ of about $0.4/1 - 2/1$, and the corresponding acids of said inorganic polyphosphates having a molar ratio of water in said inorganic polyphosphates to $P_2O_5$ of about $0.4/1 - 2/1$, 2. a polyfunctional acid phosphate ester of a polyhydric alcohol, said ester having the formula $R+OPO_3H_2)x$ wherein R is the hydrocarbyl group of a polyhydric alcohol (i.e., R is any remaining organic residue of a polyhydric alcohol used as the starting material) and $x$ is a number from 2 to 6, said esters often being referred to in the art as phosphorylated polyols.

Applicable water soluble inorganic polyphosphates include for instance any of the water soluble glassy and crystalline phosphates, e.g., the so-called molecularly dehydrated phosphates of any of the alkali metals, alkaline earth metals, and zinc, as well as zinc-alkali metal phosphates (e.g., the compound commercially available as "CALGON TG" which is substantially sodium hexametaphosphate containing about 8 percent zinc), and mixtures thereof. The claims herein are also intended to include said mixtures. Included also are the acids corresponding to these polyphosphate salts, e.g., pyrophosphoric acid ($H_4P_2O_7$) and higher phosphoric acids having a molar ratio of water to $P_2O_5$ of about $0.4/1 - 2/1$. Examples of particular inorganic polyphosphate compounds applicable include the pyrophosphates (e.g. tetrapotassium pyrophosphate and pyrophosphoric acid), the tripolyphosphates (e.g. sodium tripolyphosphate), the hexametaphosphates (e.g., sodium hexametaphosphate).

A number of processes are known in the art for preparing the phosphorylated polyols. A preferred process is to react polyphosphoric acid with a polyol. The polyphosphoric acid should have a $P_2O_5$ (i.e., phosphorus pentoxide) content of at least about 72 percent, preferably about 82 percent to 84 percent. A residue of orthophosphoric acid and polyphosphoric acid remains on completion of the reaction. This residue may be as high as about 25%–40% of the total weight of the phosphorylated polyol. It may either be removed or left in admixture with the phosphorylated polyol. Preferably the phosphorylated polyols produced by this process are prepared employing amounts of a polyphosphoric acid having about 0.5–1 molar equivalents of $P_2O_5$ for each equivalent of the polyol used. Larger amounts of polyphosphoric acid can be used if desired. By "equivalent of the polyol" is meant the hydroxyl equivalents of the polyol. For example, one mole of glycerol is three equivalents thereof, one mole of pentaerythritol is four equivalents thereof, and so forth. The phosphorylated polyols (acid esters) can be partially or completely converted to their corresponding alkali metal salts or ammonium salts by reacting with appropriate amounts of alkali metal hydroxides or ammonium hydroxide.

Preferred polyhydric alcohols (e.g., polyols) include ethylene glycol, 1,3-propane diol, glycerol, trimethanolethane, pentaerythritol, and mannitol.

Water soluble cationic polymers applicable in the present invention are:
1. a polyamide containing quaternary ammonium groups obtained by reacting a polyalkylene polyamine having two primary amine groups and at least one secondary amine group with a $C_3—C_8$ saturated aliphatic dicarboxylic acid, reacting the resulting polyamide either (a) with an alkylating agent, or (b) with epichlorohydrin, or (c) with both (a) and (b) either together or separately in any order, and 2. a polyureylene containing quaternary ammonium groups obtained by reacting a polyalkylene polyamine having two primary amine groups and at least one tertiary amine group with urea, reacting the resulting polyureylene with either (a) an alkylating agent, or (b) with epichlorohydrin.

The following are typical examples of the polyamides in (1) above:

A. Polyamides containing secondary amine groups alkylated to convert at least some of the secondary amine groups to quaternary ammonium groups with $C_1$—$C_4$ alkyl substituents.

B. Polyamides containing secondary amine groups reacted with epichlorohydrin to convert at least some of the secondary amine groups to quaternary ammonium groups, including cyclic structures. Cyclic structures are groups in which one epichlorohydrin reacts with a secondary amine group to convert it to an ammonium salt group, a four-membered ring being formed.

C. Polyamides containing secondary amine groups alkylated with formaldehyde and formic acid and reacted with epichlorohydrin to convert at least some of the secondary amine groups to quaternary ammonium groups.

Preferred polyamides in (1) above include, e.g., those obtained by reacting adipic acid with diethylenetriamine, subsequently alkylating with formaldehyde and formic acid, then reacting with epichlorohydrin and those obtained by reacting adipic acid and diethylenetriamine, subsequently alkylating with epichlorohydrin.

The following are typical examples of the polyureylenes in (2) above:

A. Polyureylenes containing tertiary amine groups reacted with alkylating agents to convert at least some of the tertiary amine groups to quaternary ammonium groups.

B. Polyureylenes containing tertiary amine groups reacted with epichlorohydrin to convert at least some of the tertiary amine groups to quaternary ammonium groups.

Preferred polyureylenes in (2) above include, e.g., those obtained by reacting N,N-bis(3-aminopropyl) methylamine with urea, and subsequently reacting with dimethylsulfate or epichlorohydrin.

With reference to the water soluble cationic polymers above, the mole ratio of polyalkylene polyamine to dicarboxylic acid is about 0.8/1–1.4/1 (preferably about 1/1), and the mole ratio of polyalkylene polyamine to urea is about 0.7/1–1.5/1 (preferably about 1/1).

Typical examples of water soluble cationic polymers applicable herein include those of U.S. Pat. Nos. 2,926,154, 3,215,654, 3,240,664 and 3,311,594.

The following examples illustrate specific embodiments of the present invention. In the examples and elsewhere herein parts and ratios are by weight, inorganic polyphosphates and water soluble cationic polymers are on a solids basis, and phosphorylated polyols are on a substantially water-free basis unless otherwise indicated. The examples are not intended to limit the present invention beyond the scope of the appended claims.

The procedure used for Examples 1–12 hereinafter was as follows.

Test solutions were prepared by adding the appropriate amount of inhibitor to be evaluated to 3,000 ml. of a synthetic cooling water (distilled water to which was added 150 ppm. $CaCl_2 \cdot 2H_2O$, 55 ppm. $MgSO_4$, 65 ppm. $Al_2(SO_4)_3 \cdot 18H_2O$, 300 ppm. $Na_2SO_4$, 180 ppm. NaCl, and 10 ppm NaF), then adjusted to pH 6.75 with NaOH. The test solution was added to the basin of a recirculating heat-treanfer corrosion test loop that consisted primarily of a glass basin, a centrifugal pump, a heat-transfer section, and a water condenser, all of which were joined with plasticized polyvinyl chloride tubing. The heat-transfer section was comprised of an outer glass jacket and a mild steel tubular specimen into which a stainless steel cartridge heater was inserted. The test solution was pumped from the basin, through the pump, to the heat-transfer section where it flowed through the annular space between the tubular specimen and the glass jacket, and finally through the center of the condenser and back to the basin. The solution was constantly aerated by means of an air sparge in the basin. The flow rate was regulated from zero to 3 gal./min., and the temperature of the test solution was maintained at 55°C.±1°C. by maintaining a constant heat output from the cartridge heater while providing cooling by passing tap water through the outer portion of the condenser. The flow rate of the tap water was regulated utilizing a thermoregulator in the basin. The tubular specimens were polished, degreased, and weighed prior to exposure, then inserted and exposed to the recirculating test solution for 20 hours; in each case, 15.7 in. of metal surface area was exposed. After exposure, the tubes were removed, dried, weighed, then immersed in 5 percent sulfuric acid (containing an amine-based corrosion inhibitor) for 3 minutes. at 70°C. to remove all scale and corrosion products, dried and reweighed. The difference between the original and final weights is referred to herein as the "weight loss" and is a measurement of the amount of corrosion that the tubular specimen underwent. The difference between the weight of the tubular specimen after exposure, before and after treatment with inhibited acid, is referred to herein as "scale deposition," and is a measurement of the amount of scale and corrosion products deposited onto the specimen.

In the Tables following Examples 1-14 the values in parenthesis under "weight loss due to corrosion and weight gain due to scale deposition" are the deposition data and the values not in parenthesis are the corrosion data. Likewise, in Examples 1–21 the apparatus and test procedures employed are well known and widely used in this art.

In the examples, the use of the water soluble cationic polymers described herein as the sole additive, gave substantially the same corrosion results as determined in a like system without any additives. These cationic polymers were found to reduce the scale deposition below the level of the deposition when no additive was employed; however, in comparison with the reduction in scale deposition achieved with the polyphosphates, this scale reduction is not considered of substantial significance when the polymers are used alone.

EXAMPLES 1–7

Examples 1–7 compare the corrosion and scale deposition data of tubes exposed to test solutions containing various phosphorylated polyols with and without Polymer A (a polyamide containing quaternary ammonium groups). Further details appear in Table I below.

TABLE I

| Example No. | ppm. Additive | | Weight Loss Due to Corrosion and Weight Gain Due to Scale Deposition, Mg. | | | | |
|---|---|---|---|---|---|---|---|
| | Phos. Polyol | Polymer A (a) | Pentaerythritol (b) | Glycerol (b) | 1,3-Propanediol (b) | Inositol (b) | Mannitol (b) |
| 1 | 60 | none | 85(162) | 152(250) | 75(148) | | 109(178) |
| 2 | 60 | 10 | 73(106) | 51(92) | 63(101) | | 100(139) |
| 3 | 100 | none | 46(138) | | | 52(158) | 36(79) |
| 4 | 100 | 20 | 26(64) | | | 49(134) | 30(68) |
| 5 | 150 | none | 36(121) | | 20(66) | 49(103) | |
| 6 | 150 | 20 | 20(39) | | 20(30) | 35(86) | |

Example 7 was a control run with 20 ppm. polymer without any phosphorylated polyol, and the results were 1,252 (1,313)

(a) Polymer A is a water soluble polyamide containing quaternary ammonium groups obtained by reacting adipic acid with diethylenetriamine in 1/1 molar ratio, subsequently alkylating with formaldehyde and formic acid, then reacting with epichlorohydrin to convert a majority of the secondary amine groups to quaternary ammonium groups.
(b) Each of the water soluble phosphorylated polyols was prepared by reacting 1.0 hydroxyl equivalent of the appropriate polyol with a 1.0 molar equivalent of polyphosphoric acid, expressed as $P_2O_5$, at 70°–110°C. for 2–4 hours.

EXAMPLES 8 and 9

Examples 8 and 9 compare the corrosion and scale deposition data of tubes exposed to test solutions containing one of various inorganic polyphosphates or polyphosphoric acid with and without Polymer A (a polyamide containing quaternary ammonium groups). Further details appear in Table II below.

EXAMPLES 15 and 16

The procedure used for Examples 15 and 16 hereinafter was as follows. The recirculating heat-transfer corrosion test loop employed for this test series was substantially the same as that described for Examples 1–14, except provision was made for periodic addition of fresh test solution to the basin (make-up), with si-

TABLE II

| Example No. | Polymer A (b) ppm. | Weight Loss Due to Corrosion and Weight Gain Due to Scale Deposition, Mg. (a) | | | | |
|---|---|---|---|---|---|---|
| | | TPPP (c) | STP (c) | HMP (c) | "Calgon TG" (c) | PPA (c) |
| 8 | none | 18(33) | 23(45) | 137(186) | 31(78) | 28(44) |
| 9 | 10 | 16(33) | 14(26) | 54(128) | 27(58) | 18(26) |

(a) Concentrations of all inorganic polyphosphates and polyphosphoric acid were 60 ppm., calculated as $PO_4$.
(b) See definition (a) following Table I.
(c) TPPP is tetrapotassium pyrophosphate;
STP is sodium tripolyphosphate;
HMP is sodium hexametaphosphate (Calgon glass);
"Calgon TG" is a tradename for a glassy zinc-sodium hexametaphosphate;
PPA is polyphosphoric acid (82–86% $P_2O_5$).

EXAMPLES 10–14

Examples 10–14 compare the corrosion and scale deposition data of tubes exposed to test solutions containing a particular phosphorylated polyol, i.e., phosphorylated pentaerythritol (PPE) with and without various water soluble cationic polymers of this invention. Further details appear in Table III below.

multaneous discharge (blowdown) of recirculating solution. An initial high-level dosage treatment (3.3 times that of the maintenance dosage) was employed for 24 hours followed by treatment at the maintenance level for the duration of the 14-day period. The corrosion rates in mils per year (mpy.) and scale deposition in milligrams per square centimeter (mg./cm.$^2$) of ex-

TABLE III

| Example No. | ppm. Additive | | Weight Loss Due to Corrosion and Weight Gain Due to Scale Deposition, Mg. | | |
|---|---|---|---|---|---|
| | PPE | Polymer | Polymer A (a) | Polymer B (b) | Polymer C (c) |
| 10 | 60 | none | 85(162) | 85(162) | |
| 11 | 60 | 10 | 73(106) | 73(125) | |
| 12 | 150 | none | 36(121) | 36(121) | 36(121) |
| 13 | 150 | 20 | 20(39) | 18(42) | 25(64) |
| 14 | none | 20 | 1,252(1,313) | 1,170(1,230) | 1,310(1,400) |

(a) See definition (a) following Table I.
(b) Polymer B is a water soluble polyamide containing quaternary ammonium groups obtained by reacting adipic acid with diethylenetriamine in 1/1 molar ratio, then reacting with epichlorohydrin to convert a majority of the secondary amine groups to quaternary ammonium groups.
(c) Polymer C is a water soluble polyureylene containing quaternary ammonium groups obtained by reacting urea with N,N-bis (aminopropyl)methylamine in 1/1 molar ratio, then reacting with epichlorohydrin to convert a majority of the tertiary amine groups to quaternary ammonium groups.

posed surface area of the tubular mild steel specimens are given below for test solutions containing either phosphorylated pentaerythritol (PPE), inorganic polyphosphate or polyphosphoric acid with and without Polymer A (a polyamide containing quaternary ammonium groups). The maintenance concentration of additive other than Polymer A was 30 ppm., calculated as $PO_4$. Further details appear in Table IV below.

the tradename "CORRATOR" from Magna Corporation of Santa Fe Springs, California. This corrosion rate meter and its use in the art is known, and also discussed by C. C. Wright in Journal Petroleum Technology, page 269, Mar. 1965, "Applying Instantaneous Corrosion Rate Measurements to Waterflood Corrosion Control." Further details appear in Table VI below.

TABLE IV

| | | Corrosion Rate, Mpy. (Scale Deposition, Mg./Cm²) (a) | | | |
|---|---|---|---|---|---|
| Example No. | Polymer A (b) ppm. | PPE (c) | STP (c) | "Calgon TG" (c) | PPA (c) |
| 15 | none | 2.3(5.0) | 3.8(7.8) | 3.7(8.4) | 0.8(2.4) |
| 16 | 6 | 1.3(1.0) | 0.4(1.2) | 0.6(0.7) | 0.5(0.5) |

(a) Values not in parenthesis are corrosion rates, expressed as mils per year, values in parenthesis represent scale deposition in mg./cm.².
(b) See definition (a) following Table I.
(c) PPE is phosphorylated pentaerythritol;
STP is sodium tripolyphosphate;
"Calgon TG" is a tradename for a glassy zinc-sodium hexametaphosphate;
PPA is polyphosphoric acid (82–86% $P_2O_5$).

EXAMPLES 17–19

The procedure used for Examples 17–19 below was substantially the same as that described for Examples 15 and 16 except using a higher rate of water circulation. Provision was made for make-up and blowdown of the test solution, an initial dosage 3 times that of the maintenance dosage was employed for the first 24 hours, and the duration of the test was 14 days. In this manner, the effects of adding Polymer A to test solutions containing 50 ppm. phosphorylated pentaerythritol was determined. Further details appear in Table V below.

TABLE V

| Example No. | PPE (a) ppm. | Polymer A (b) ppm. | Corrosion Rate, Mpy. (Scale Deposition, Mg./Cm².) (c) |
|---|---|---|---|
| 17 | 50 | none | 9.6(16.6) |
| 18 | 50 | 1 | 6.2(12.3) |
| 19 | 50 | 6.7 | 3.1(3.3) |

(a) PPE is phosphorylated pentaerythritol.
(b) See definition (a) following Table I.
(c) Values not in parenthesis are corrosion rates, expressed as mils per year, values in parenthesis represent scale deposition in mg./cm.².

EXAMPLES 20 and 21

The procedure used for Examples 20 and 21 hereinafter was as follows. Test solutions (1,500 ml.) were prepared according to the procedure described for Examples 1–14. The solutions were added to resin kettles wrapped with heating tape and equipped with a thermoregulator to maintain the temperature of the medium at 55°C.±1°C., a sparge tube to maintain air saturation of the solution, and a condenser to prevent evaporation losses from the test solution. A dual electrode probe designed to measure instantaneous corrosion rates was immersed in the test solution for 20 hours, and corrosion rates were measured at that time. Probes containing electrodes of the various metals given in Table VI below were used. In this manner, it was found that the combined use of a polyphosphate with a water soluble cationic polymer (Polymer A) was also an effective corrosion inhibitor for nonferrous metals usually encountered in cooling water systems. The dual electrode probe used is commercially available under

TABLE VI

| | | Corrosion Rate, Mpy. (a) | | |
|---|---|---|---|---|
| Ex. No. | Additive | Copper | Admiralty | Aluminum |
| 20 | none | 1.0 | 1.6 | 0.7 |
| 21 | 150 ppm. PPE + 20 ppm. Polymer A(b) | 0.7 | 0.8 | 0.5 |

(a) Mpy. is mils per year.
(b) PPE is phosphorylated pentaerythritol; Polymer A is a water soluble polyamide containing quaternary ammonium groups obtained by reacting adipic acid with diethylene-triamine in 1/1 molar ratio, subsequently alkylating with formaldehyde and formic acid, then reacting with epichlorohydrin to convert a majority of the secondary amine groups to quaternary ammonium groups.

The following examples illustrate the effect of water composition on the effectiveness of the water conditioning process of this invention to reduce corrosive attack and/or scale accumulation on metal surfaces which the water contacts.

EXAMPLES 22–32

An aerated, synthetic cooling water at 55°C. was recirculated at a flow rate of 2.5 ft./sec. through a single-tube (mild steel) heat-exchanger in which the mild steel heat transfer tube in the exchanger was the specimen under study. In these examples a relatively high inhibitor dosage of 150 ppm. of phosphorylated pentaerythritol (polyphosphate) was employed to insure adequate initial film formation. The water being recirculated during these tests is a low hardness water to which was added various constituents in designated amounts such as interference ions, i.e., aluminum, or potential foulants such as suspended solids. The corrosion and scale deposition results after 20 hours of operation of the system are set forth in Table VII below.

TABLE VII

| | | Weight Loss Due to Corrosion and Weight Gain due to Scale Deposition, Mg. | |
|---|---|---|---|
| Ex. No. | Water Composition[a] | 200 ppm PPE (b) | 200 ppm PPE, 60 ppm Polymer A (c) |
| 22 | SS-1 | 21(40) | 19(24) |
| 23 | SS-1 + 5 ppm $Al_2O_3$ | 68(94) | 43(51) |

TABLE VII-Continued

| Ex. No. | Water Composition[a] | Weight Loss Due to Corrosion and Weight Gain due to Scale Deposition, Mg. | |
|---|---|---|---|
| | | 200 ppm PPE (b) | 200 ppm PPE, 60 ppm Polymer A (c) |
| 24 | SS-1 + 10 ppm $Al_2O_3$ | 115(133) | 78(92) |
| 25 | SS-1 + 10 ppm Fe | 19(43) | 18(25) |
| 26 | SS-1 + 50 ppm $SiO_2$ | 125(104) | 44(40) |
| 27 | SS-1 + 150 ppm S.S. | 34(37) | 18(30) |
| 28 | SS-1 + 30 ppm $PO_4$ | 68(64)d | 32(50)d |
| 29 | SS-1 + 600 ppm $CaCO_3$ | 58(60)d | 43(40)d |
| | | 333 ppm PPE (b) | 333 ppm PPE (b), 60 ppm Polymer A (c) |
| 30 | SS-1 + 10 ppm $Al_2O_3$ | 21(55) | 20(26) |
| 31 | SS-1 + 5 ppm Fe | 75(128) | 48(43) |
| 32 | SS-1 + 50 ppm $SiO_2$ | 32(47) | 20(21) |

(a) Water SS-1 contains the following: 300 ppm Ca as $CaCO_3$, 100 ppm Mg as $CaCO_3$, 400 ppm Cl as NaCl, 500 ppm $SO_4$ as $Na_2SO_4$, and 10 ppm alkalinity as $CaCO_3$. Alumina was added as $Al_2(SO_4)_3 \cdot 18H_2O$, iron as $FeCl_2 \cdot 4H_2O$, silica as $Na_2SiO_3 \cdot 5H_2O$, suspended solids as Bentonite, phosphate as $Na_2HPO_4$ and calcium hardness as $CaCl_2 \cdot 2H_2O$.
(b) PPE is phosphorylated pentaerythritol.
(c) For definition of Polymer A see footnote (a) following able 1.
(d) These results are based on exposure for 3 days rather than 20 hours.

In Example 22, the addition of cationic polymer to the phosphorylated polyol corrosion inhibitor in accordance with this invention resulted in marginal improved performance in reducing corrosion. Substantial improvement in reduction of corrosion and scale deposition is illustrated by Examples 23-32. While not being limited thereto the method of this invention is most effective for use in water systems containing interference ions such as aluminum, and waters containing a potential foulant or precipitant such as silica, iron, suspended solids or high orthophosphate. Thus, the method of this invention applies to waters in which the combined effect of using the polyphosphates and water soluble cationic polymers results in reduction of corrosion and scale deposition on metals in contact with the water to a level below that achieved when these respective components are employed alone in the water in like quantities. Characterization of all waters in which such improvement will be realized is impossible because of the diverse constituents in water depending on its source and the condition of the water when treated. However, one skilled in the art can readily determine if the combination of polyphosphate and cationic polymers defined herein are effective in improving the reduction in corrosion and accumulation of deposits on metals following the procedures described herein.

In the method of this invention the amount of inorganic polyphosphate employed is not critical and may vary widely, depending primarily on the severity of the corrosion and scale deposition problems. Maintenance dosages of about 5-500 ppm. (often about 20-100 ppm.) by weight are used, calculated as $PO_4$.

The amount of phosphorylated polyol is not critical and may vary widely depending primarily on the severity of the corrosion and scale deposition problems. Maintenance dosages of about 5-500 ppm. (often about 20-100 ppm.) by weight are used, calculated as $PO_4$.

The amount of cationic polymer is not critical and may vary widely depending primarily on the amount of inorganic polyphosphate of phosphorylated polyol used. The weight ratio range of inorganic polyphosphate (calculated as $PO_4$) to cationic polymer (polymer on solids basis) of about 2/1-50/1 (often about 5/1-10/1) is used. The weight ratio range of phosphorylated polyol (calculated as $PO_4$) to cationic polymer (polymer on solids basis of about 2/1-50/1 (often about 5/1-10/1) is used. Expressed as parts per million cationic polymer on solids basis by weight of the water being treated, the amount of cationic polymer is about 0.2-20 ppm. (often about 2-10 ppm.).

The phosphorylated polyols are usually extremely viscous liquids at room temperature. These materials may be diluted and partially or completely neutralized with an alkali metal or ammonium base to provide a less viscous solution (e.g., 25%-50%) for easier handling.

The polyphosphates described herein may be added directly to the cooling water system either periodically or (preferably) continuously, based on the make-up requirements of the system. It is usually more desirable to first dissolve or dilute the polyphosphates with water in a chemical feed tank, then pump continuously into the recirculating water. Dilution to 1%-10% at this stage is typical.

The polymers are usually available as viscous aqueous solutions or dispersions. These may be incorporated into formulations containing the polyphosphates, or may be added to the cooling water separately from the polyphosphates on a periodic or continuous basis. It is usually more desirable to first dilute the polymers with water, then pump continuously into the recirculating water separately from the polyphosphate addition. Thus, the particular manner and form are not critical in which the phosphorylated polyols, inorganic polyphosphates and polymers are used.

This invention is applicable to all metals, e.g., ferrous and nonferrous, subject to corrosion and/or scale deposition in circulating water systems. These metals include, e.g., mild steel, cast iron, zinc, copper, copper-based alloys, and aluminum.

The method of this invention for the reduction of corrosion and scale deposition on metal surfaces offers several advantages over the prior art practice of using the polyphosphates alone. In many cooling water systems where either an inorganic polyphosphate or a phosphorylated polyol has been employed as a corrosion inhibitor, the additional use of the polymers described herein will lower the corrosion rates (thereby increasing equipment life) and substantially reduce further scale deposition (thereby providing greater heat exchanger efficiencies and preventing losses in heat transfer ability). In such systems, the combined use of both components (i.e., polyphosphate and polymer) enables the dosage required to maintain a given corrosion rate and scale deposition rate to be lower for the polyphosphate than is possible in the absence of the polymer. This has obvious advantages since the polyphosphate can serve as a nutrient for algae and as a source of phosphate sludge.

As many apparent and widely different embodiments of this invention may be made without department from the spirit and scope thereof, it is to be understood that the invention is not limited to the specific embodiments thereof except as defined in the appended claims.

What I claim and desire to protect by Letters Patent is:

1. Method of conditioning circulating water to reduce the corrosive attack and scale accumulation on metal surfaces which the water contacts which comprises introducing into said water a water soluble polyphosphate and a water soluble cationic polymer, said polyphosphate being a polyfunctional acid phosphate ester of a polyhydric alcohol, said ester having the formula R—OPO$_3$H$_2$)x wherein R is the hydrocarbyl group of a polyhydric alcohol and $x$ is a number from 2 to 6, and said cationic polymer being a polyamide containing quaternary ammonium groups obtained by reacting a polyalkylene polyamine having two primary amine groups and at least one secondary amine group with a C$_3$—C$_8$ saturated aliphatic dicarboxylic acid, reacting the resulting polyamide either (a) with an alkylating agent, or (b) with epichlorohydrin, or (c) with both (a) and (b) together or separately in any order, said cationic polymer being employed in an amount of from about 0.2–20 p.p.m. based on the weight of water being conditioned and the weight ratio range of polyphosphate to cationic polymer being from about 2/1 to 50/1, whereby the corrosive attack and scale deposition on the metal surfaces is reduced to a level below that achieved when these respective components are employed alone in the water in like quantities.

2. The method of claim 1 wherein the amount of cationic polymer employed is from about 2–10 p.p.m. based on the weight of water being conditioned.

3. The method of claim 2 wherein the range of said polyphosphate to said cationic polymer is from about 5/1–10/1.

* * * * *